United States Patent
Braden

(10) Patent No.: US 7,651,607 B2
(45) Date of Patent: Jan. 26, 2010

(54) CHLORINATOR FOR WASTEWATER TREATMENT SYSTEMS

(76) Inventor: Michael R. Braden, 24097 Highway 6, Hempstead, TX (US) 77455

( * ) Notice: Subject to any disclaimer, the term of this patent is extended or adjusted under 35 U.S.C. 154(b) by 266 days.

(21) Appl. No.: 11/684,356

(22) Filed: Mar. 9, 2007

(65) Prior Publication Data
US 2008/0217233 A1 Sep. 11, 2008

(51) Int. Cl.
C02F 1/76 (2006.01)
G01F 11/28 (2006.01)

(52) U.S. Cl. ............... 210/101; 210/170.08; 210/198.1; 210/205; 210/209; 210/532.2; 222/129; 222/464.1

(58) Field of Classification Search ............... 210/101, 210/109, 110, 139, 170.08, 198.1, 200, 205, 210/206, 207, 209, 248, 532.2, 98; 137/115.11, 137/391; 222/56, 147, 424.5, 442, 638, 644, 222/129, 464.1
See application file for complete search history.

(56) References Cited

U.S. PATENT DOCUMENTS

| | | | |
|---|---|---|---|
| 3,654,637 A * | 4/1972 | Young | 137/592 |
| 3,727,632 A | 4/1973 | Pansini | |
| 3,996,139 A | 12/1976 | Prince et al. | |
| 4,019,983 A | 4/1977 | Mandt | |
| 4,093,551 A * | 6/1978 | Paabo et al. | 210/207 |
| 4,100,073 A | 7/1978 | Hopcroft | |
| 4,333,833 A | 6/1982 | Longley et al. | |
| 5,350,512 A | 9/1994 | Tang | |
| 5,405,540 A | 4/1995 | Tang | |
| 6,182,681 B1 | 2/2001 | Robertson et al. | |
| 6,183,630 B1 | 2/2001 | Reeves | |
| 6,627,071 B1 | 9/2003 | Braden | |
| 6,932,912 B2 | 8/2005 | Chaffin | |

OTHER PUBLICATIONS

Definition of "vent" from Merriam-Webster Online Dictionary, accessed Mar. 2009.*

* cited by examiner

Primary Examiner—Matthew O Savage
Assistant Examiner—Lucas Stelling
(74) Attorney, Agent, or Firm—James E. Hudson, III; Crain, Caton & James, P.C.

(57) ABSTRACT

A chlorinator for wastewater treatment systems having a circulation pump, circulation tank, and return flow line, which includes a reservoir of disinfectant fluid and a dosage container communicating with the reservoir and the circulation tank to dispense a determined quantity of disinfectant during operation of the circulation pump. The dosage container is vented to atmosphere to prevent vacuum lock in operation and communicates with the reservoir at a flow rate substantially smaller than it communicates with the circulation tank. Operation of the circulation pump causes flow through the return line, inducing distribution of the quantity of disinfectant fluid into the circulation tank. As the dosage container outgoing flow rate far exceeds the dosage container incoming flow rate, once the disinfectant level drops below the point of communication between the dosage container and the circulation tank, no her disinfectant is drawn into the circulation tank. A near-uniform volume of disinfectant fluid is thereby supplied per pump cycle.

13 Claims, 5 Drawing Sheets

CHLORINATOR FOR WASTEWATER TREATMENT SYSTEMS

CROSS REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

This invention related generally to chlorinators for wastewater treatment systems. More specifically, this invention is a chlorinator for wastewater treatment systems, which have a disinfectant chamber that permits a uniform volume of disinfectant to be used each cycle.

2. Description of the Related Art

Chlorinators, which use either solid or liquid disinfectants, are known to the prior art. Illustrative of chlorinators using solid disinfectants are U.S. Pat. No. 6,183,630 issued to Reeves on Feb. 6, 2001; U.S. Pat. No. 4,100,073 issued to Hopcroft on Jul. 11, 1978; U.S. Pat. No. 5,350,512 issued to Tang on Sep. 27, 1994; and U.S. Pat. No. 5,405,540 issued to Tang on Apr. 11, 1995. Illustrative of chlorinators using liquid disinfectants are U.S. Pat. No. 4,333,833 issued to Longley et. al. on Jun. 8, 1982; U.S. Pat. No. 4,019,983 issued to Mandt on Apr. 26, 1977 and U.S. Pat. No. 3,996,139 issued to Prince et al. on Dec. 7, 1976.

Chlorination is widely used as part of wastewater treatment systems. In practice, a disinfectant such as chlorine is introduced at a point in the wastewater treatment system after which sufficient time, either by flow into a storage tank or through a region of flow, occurs to permit the chlorine to effectively disinfect the contaminant-bearing wastewater. The amount of disinfectant added to the wastewater is referred to as the "dosage," and is usually expressed as milligrams per liter (mg/l) or parts per million (ppm). The amount of disinfectant necessary to disinfect a particular volume of wastewater is referred to as the "demand."

The reaction between the disinfectant and the contaminants is typically not instantaneous but is instead time dependent. In order to obtain adequate disinfection, the mixing of wastewater and disinfectant should be completed in the shortest time possible, ideally a fraction of a second. The amount of disinfectant remaining in the wastewater at the time of measurement is referred to as the "residual." The residual is therefore determined by the demand subtracted from the dosage.

Prior art chlorinators, whether using a liquid or solid disinfectant, typically mix the disinfectant with the wastewater during the flow of wastewater through the wastewater treatment system. In the case of chlorinators using a solid disinfectant, such as those disclosed in U.S. Pat. No. 6,183,630 issued to Reeves on Feb. 6, 2001; U.S. Pat. No. 4,100,073 issued to Hopcroft on Jul. 11, 1978; U.S. Pat. No. 5,350,512 issued to Tang on Sep. 27, 1994; and U.S. Pat. No. 5,405,540 issued to Tang on Apr. 11, 1995, mixing occurs by wastewater flow about a plurality of disinfectant tablets. In such systems the disinfectant is mixed at a rate dependant on the surface area of the table in contact with the wastewater, the density of the wastewater and the flow rate of the wastewater, among other variables. In the case of chlorinators using a liquid disinfectant, such as U.S. Pat. No. 4,333,833 issued to Longley et. al. on Jun. 8, 1982 mixing occurs at a contactor in the flowline wherein disinfectant fluid is drawn from a reservoir by pressure differential. In such systems the amount of chlorine combined with the wastewater varies with the flow rate of the wastewater and; wastewater density. Thus it would be beneficial to the prior art to provide a chlorinator that dispenses a uniform volume of chlorine.

Other chlorinators using liquid disinfectant are likewise known, such as those disclosed in U.S. Pat. No. 6,627,071 issued to Braden on Sep. 30, 2003 and U.S. Pat. No. 6,932,912 issued to Chaffin on Aug. 23, 2005. U.S. Pat. No. 6,627,071 issued to Braden teaches a chlorinator for wastewater treatment systems having a circulation pump and return flow line which includes a disinfectant container, rendered buoyant by a float, floating within a space internal to a tank wherein the buoyant container intakes a determined quantity of disinfectant fluid through a check valve, which terminates communication between the disinfectant container and tank during operation of a circulation pump. After cessation of the circulation pump, the check valve opens to reestablish the quantity of disinfectant fluid. As a result operation is dependent on a functioning check value. U.S. Pat. No. 6,932,912 issued to Chaffin on Aug. 23, 2005 discloses a system which continuously supplies liquid disinfectant so long as the circulation pump is active and the volume of disinfectant can be withdrawn from a single disinfectant reservoir. Such unlimited, as a result of circulation pump action, or unknown, as a result of exhaustion of some unknown volume of disinfectant remaining in the disinfectant reservoir, may result in excessive or inadequate dosage of chlorine. It would therefore be an improvement to properly control the volume of chlorine dispensed.

Typical water treatment systems contain sequential chambers for elimination of solid waste, which would not be consumed by aerobic action, for aerobic treatment of the wastewater, for clarification of the wastewater and for storage of treated wastewater prior to disbursal to the environment by a sprinkler system. Disinfectant is mixed with the treated wastewater between clarification and disbursal. Disbursal of treated wastewater by a sprinkler or line output system is accomplished by mechanical pumping action. Such systems utilize a pump, which generates pressure in excess of that necessary for operation of the attached output system. As a result a pressure relief valve set to the necessary pressure is located in the pump line prior to exit from the pump tank. This valve permits return of a necessary amount of treated wastewater into the pump tank so as not to exceed the necessary output pressure. Return of treated wastewater into the pump tank creates a turbulent area within the treated wastewater in the pump tank.

It would be therefore be an improvement to provide a chlorinator that dispenses a near uniform volume of chlorine into this turbulent area without an external power supply and with no moving parts.

SUMMARY OF THE INVENTION

Accordingly, it is an object of the present invention to provide, inter alia, a chlorinator for aerobic waste treatment systems that dispenses a uniform volume of liquid disinfectant rapidly mixes the disinfectant fluid with the wastewater without the need for a power source beyond that in an existing wastewater treatment system and without moving parts.

Other objects of my invention will become evident throughout the reading of this application.

The invention is a chlorinator for waste treatment systems that is in functional attachment to a pump line in a pump tank, which dispenses a uniform volume of disinfectant fluid during each pump cycle, regardless of the duration of the cycle.

In one embodiment a pump, driven by the existing circulation pump, is attached to a dosage container via a disinfectant fluid line. The dosage container is vented to atmosphere to prevent vacuum lock in operation and communicates with the reservoir at a flow rate substantially smaller than it communicates with the circulation tank. When the pump activates, the volume of dosage container is emptied into the final chamber of the waste treatment system, which may be a clarification chamber or a holding or pump tank. The dosage container refills at such a slow rate that little additional disinfectant may be withdrawn to the circulation tank.

Alternatively, the invention may include a discharge pump located in the final chamber of the waste treatment system to operate at a pressure greater than the system's sprinklers or lines, and a pressure relief valve such that when the discharge pump activates, the pressure relief valve opens and diverts from flow to return line. A venturi pump may be placed in-line with the return line such that flow through the return line creates a vacuum in the disinfectant fluid line. The disinfectant fluid line passes through dosage container vent to terminate in the reservoir container. The dosage container communicates with the reservoir container via passage located in the vent or on the surface of the dosage container.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

DETAILED DESCRIPTION OF THE PREFERRED EMBODIMENT

Figure 1:
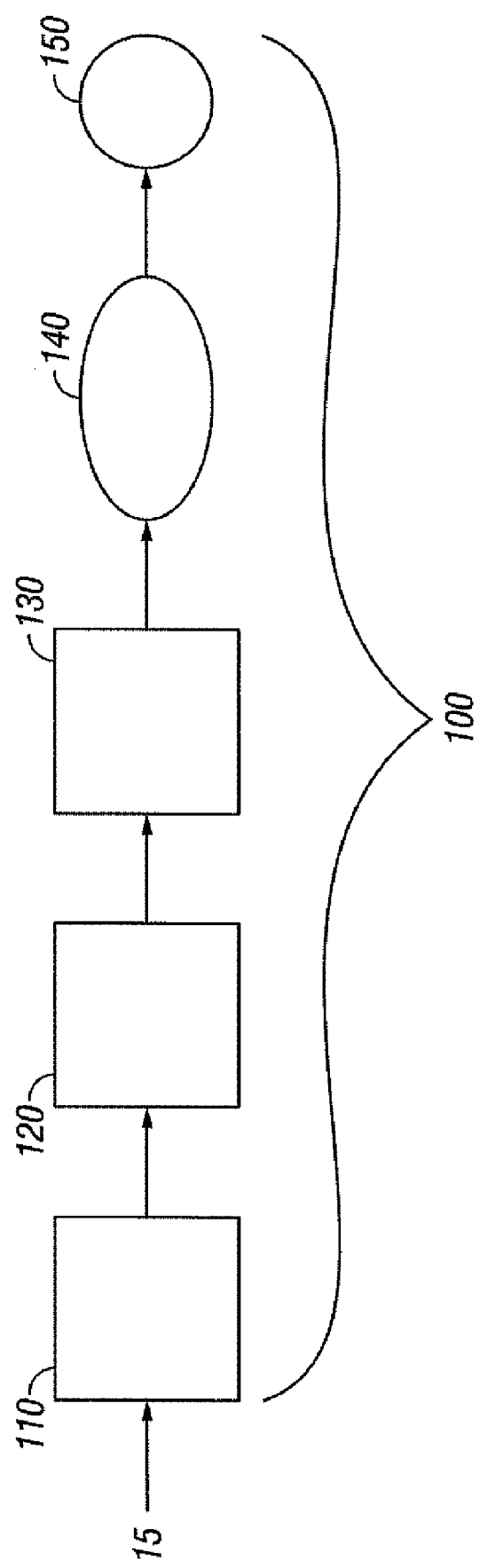
FIG. 1 is a schematic diagram of a typical three chamber septic system.

As shown in FIG. 1, a typical water treatment system 100 contains a series of steps that prepare wastewater 15 for release into the environment. The exemplary water treatment system 100 has a solid waste elimination chamber 110, an aerobic treatment chamber 120, a clarification and pump tank chamber 130, a chlorine addition step 140 and a disbursal step 150. In an alternative water treatment system (not shown), clarification and pump tank chamber 130 may be divided among a clarification chamber and a pump tank. This invention addresses the chlorine addition step 140.

Figure 2:
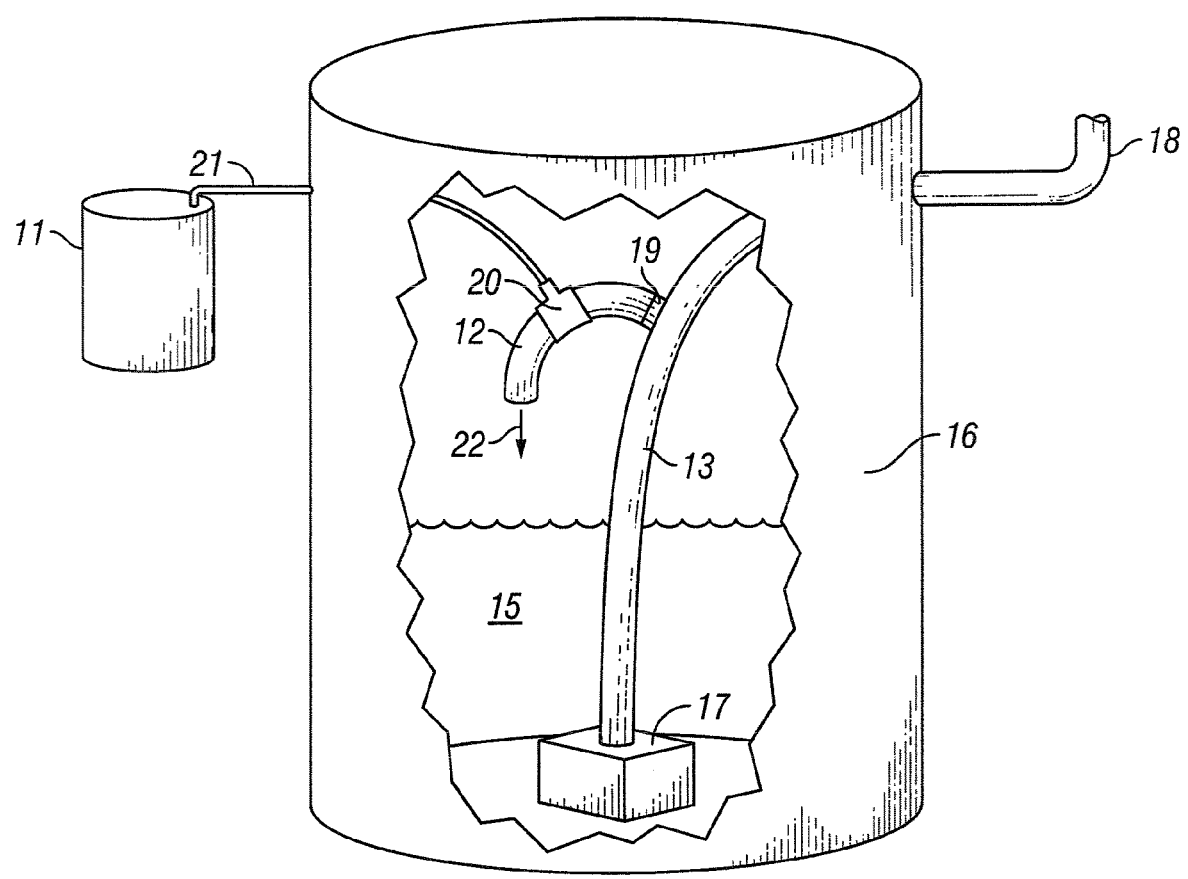
FIG. 2 is a partial cut-away side view of the wastewater treatment system pump tank of the present invention.

As shown in FIG. 2, the chlorinator 11 is in functional attachment to flow return line 12 of pump line 13 and, while in use, disburses a uniform volume of disinfectant fluid 14 (not shown) through disinfectant fluid line 21, which has a dosage container end and a pump end, into flow return line 12 to be mixed with return wastewater 22 and ultimately with wastewater 15 in the pump tank 16. Pump tank 16 provides storage for wastewater 15 prior to being pumped by pump 17 to the sprinkler system 18. Pump 17 transmits wastewater 15 at a pressure significantly higher than necessary for output 18, which may be lines or a sprinkler system. A pressure relief valve 19 in pump line 13 releases a sufficient volume of wastewater 15 into flow return line 12 to prevent damage to output 18 due to excessive pressure. Pump 17 operates on an intermittent basis. Pump 17 is activated either by timer or by the level of wastewater 15 and operates until the termination of the time cycle or until wastewater falls below a specific level in pump tank 16. At all times during operation of pump 17 some portion of wastewater 15 is diverted by pressure relief value 19 to flow return line 12 as return wastewater 22. When return wastewater 22 flows through flow return line 12 disinfectant fluid 14 (not shown) is introduced from chlorinator 11 through disinfectant fluid line 21 at disinfectant connection 20. Disinfectant fluid 14 enters the return wastewater 22, which returns to pump tank 16, and mixes back into the balance of wastewater 15. Disinfectant fluid 14 is thereby mixed with wastewater 15 in pump tank 16 during the operation of pump 17. In a typical system, the pump 17 produces substantially more pressure than the maximum pressure of the sprinkler system 18, so introduction of return wastewater 22 creates turbulence in the pump tank 16 upon its return to the wastewater 15.

Disinfectant fluid 14 may be drawn from chlorinator 11 during operation of pump 17 by any of various pumps known in the art. Referring to FIG. 2 and FIG. 5, in the exemplary embodiment the disinfectant connection 20 is a flow-powered venturi vacuum pump 200 located in flow return line 12. As understood in the art and illustrated in FIG. 4, a flow-powered venturi vacuum pump 200 is a device which generates an area of reduced pressure in chamber 201 by passing a liquid, in this case return wastewater 22, in flow return line 12, through the chamber 201, defined by a narrowed wall segment 202. The reduced pressure in chamber 201 draws disinfectant fluid 14 through disinfectant fluid line 21, out pump opening 205 and into flow return line 12.

Figure 3:
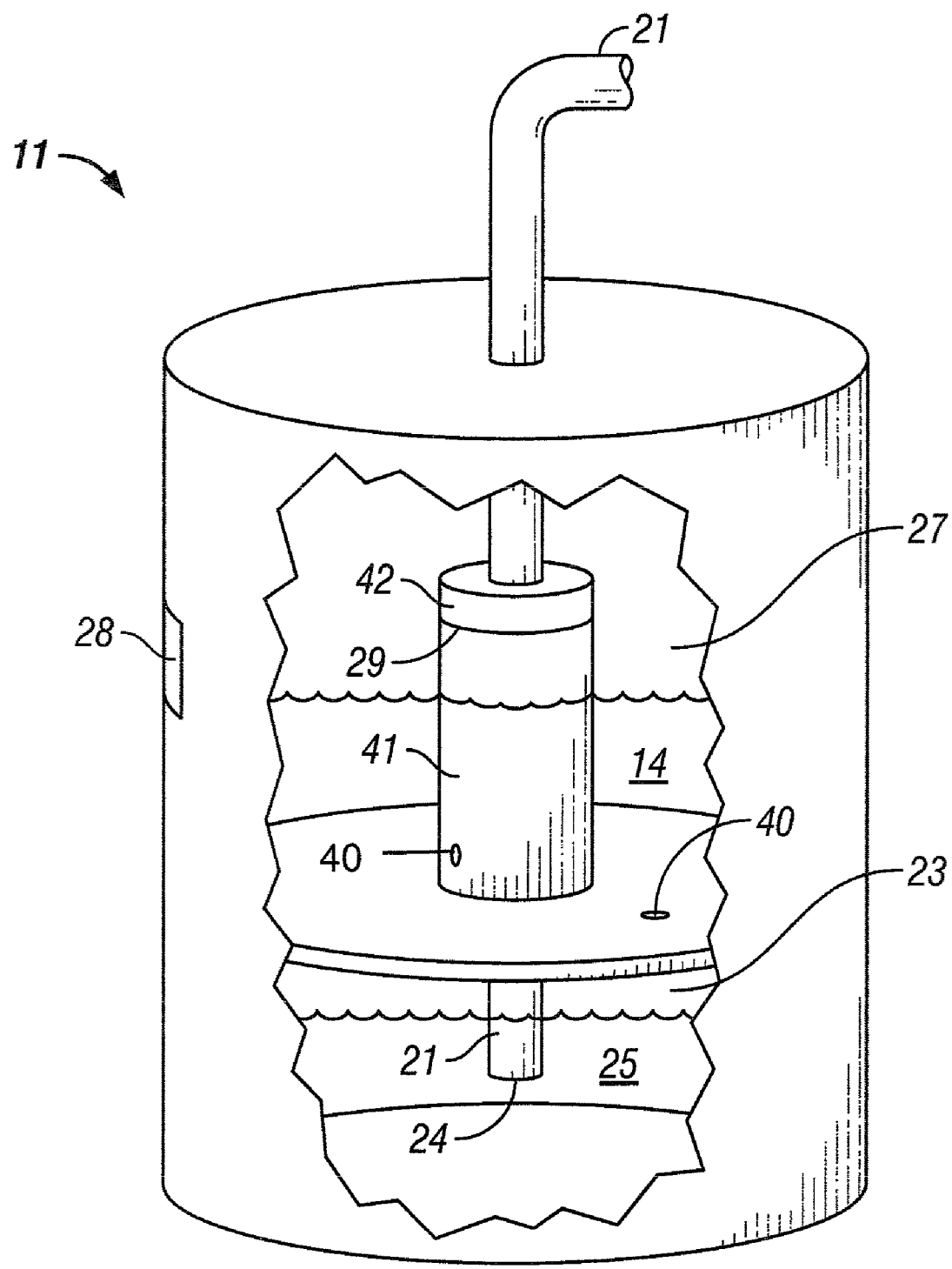
FIG. 3 is a partial cut-away side view of the exemplary chlorinator functionally attached to the flow return line of the pump line.
Figure 4:
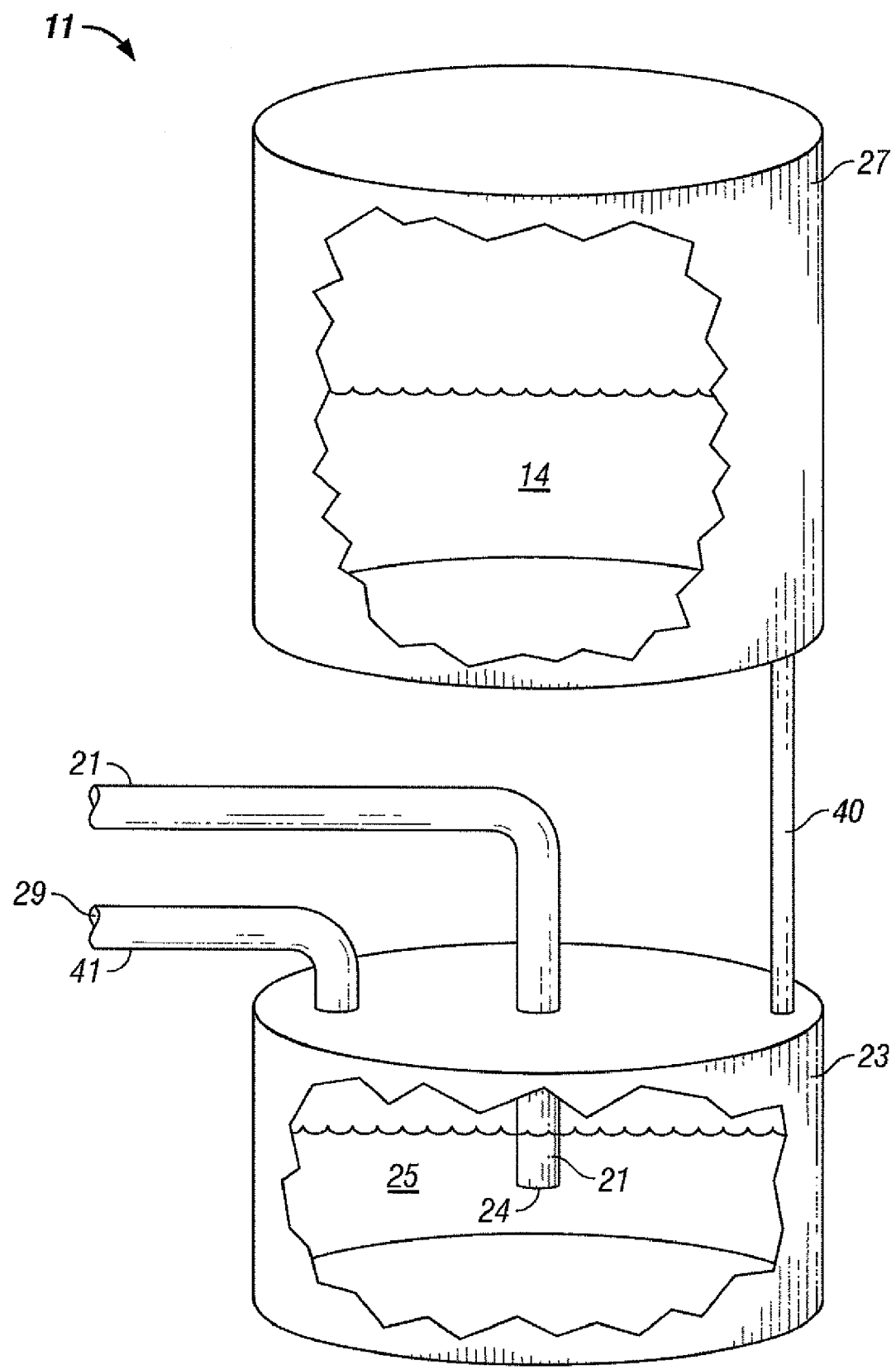
FIG. 4 is a partial cut-away side view of an alternative chlorinator functionally attached to the flow return line of the pump line.
Figure 5:
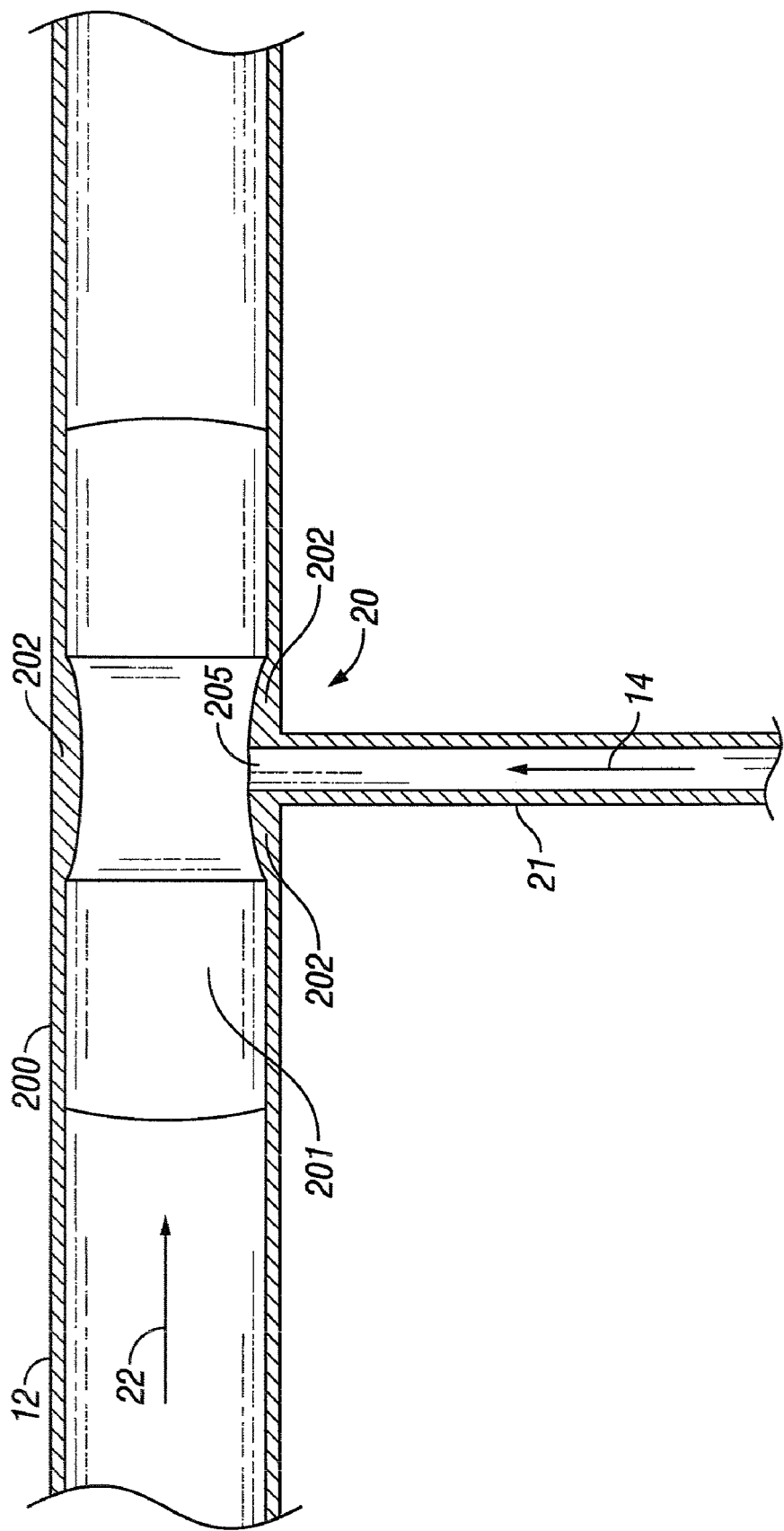
FIG. 5 is a cross-sectional side view of a typical flow powered venturi vacuum pump.

Referring to FIGS. 2, 3, and 4 when the pump 17 is active disinfectant fluid 14 is withdrawn from chlorinator 11. In the exemplary embodiment the flow-powered venturi vacuum pump 200 rapidly draws disinfectant fluid 14 into the wastewater 15 through disinfectant fluid line 21, which terminates in dosage container 23. When the portion of fluid disinfectant volume 25 above the bottom orifice 24 of disinfectant fluid line 21 is withdrawn, chlorinator 11 ceases to supply additional disinfectant fluid 14 and instead supplies air, which is drawn from reservoir container 27 via venting member 41, which has a vent. As depicted in FIG. 3, venting member 41 may be located to pass through reservoir container 27, and may then have a valve or float 42 to prevent fluid communication to dosage container 23 from reservoir container 27. Preferably where venting member 41 passes through reservoir container 27, reservoir container 27 has an overfill exit 28 or other apparatus known in the art to prevent the filling of reservoir container 27 above the top 29 of venting member 41. In the exemplary embodiment, as dosage container 23 draws air from within chlorinator 11, which is relatively saturated with disinfectant gas, thereby possessing less capacity to degrade the disinfectant fluid with which it comes in contact. Alternatively, as depicted in FIG. 4, venting member 41 may be located to pass to atmosphere.

In the preferred embodiment disinfectant fluid line 21 communicates with dosage container 23 by passing though venting member 41, which passes through reservoir container 27.

Volume 25 is replenished via dosage passageway 40. Dosage passageway 40 is sized that the flow rate of disinfectant fluid 14 through disinfectant fluid line 21 during operation of pump 17 so far exceeds the flow rate of disinfectant fluid 14 through dosage passageway 40 that the additional inflow of disinfectant fluid 14 during operation of pump 17 is negligible compared to the total volume of disinfectant fluid 23. In the preferred embodiment, disinfectant fluid line 21 is at least five times the cross sectional area of dosage passageway 40. Dosage passageway 40 may be located at the interface between reservoir container 27 and dosage container 23, or through venting member 41 where venting member 41 passes through reservoir container 27. Alternatively, dosage passageway 40 may be piping connecting reservoir container 27 and dosage container 23.

There is essentially no increase in the volume of disinfectant fluid 25 during operation of pump 17. Once the level of fluid disinfectant 14 drops below the bottom orifice 24 of disinfectant fluid line 21, no further disinfectant fluid 14 is drawn into the circulation tank.

The volume withdrawn during operation of chlorinator 11 may be adjusted by resizing of dosage container 23 or by adjustment of the location of the bottom orifice 24 of disinfectant fluid line 21. A smaller dosage container 23 or positioning of the bottom orifice 24 of disinfectant fluid line 21 higher in dosage container 23 will result in less disinfectant being added per cycle of pump 17. Likewise a larger dosage container 23 or positioning of the bottom orifice 24 of disinfectant fluid line 21 lower in dosage container 23 will result in more disinfectant being added per cycle of pump 17.

In operation, venting member 41 may be removably attached to dosage container 23, preferably by a threaded connection. Likewise, reservoir container 27 may be sized to accept dosage container 23 via a press-fit at its lower-most point.

The terms and expressions which have been employed in the foregoing specification are used therein as terms of description and not of limitation, and there is no intention, in the use of such terms and expressions, of excluding equivalents of the features shown and described or portions thereof.

I claim:

1. A chlorinator for a wastewater treatment system for delivering a uniform volume of liquid disinfectant per pump cycle, said wastewater treatment system having a discharge pump and a pressure relief valve, said discharge pump operating during a pump cycle, said pressure relief valve communicating with a return line, said chlorinator comprising:

a disinfectant reservoir container, said disinfectant reservoir container adapted to contain a volume of disinfectant fluid therein;

a dosage container, said dosage container positioned below said disinfectant reservoir container, said dosage container in fluid communication with said disinfectant reservoir container via a dosage passageway;

a flow pump adapted to operably connect to said return line;

a disinfectant fluid line having a dosage container end and a pump end, said disinfectant fluid line in fluid communication with said dosage container and in fluid communication with said flow pump, said disinfectant fluid line dosage container end positioned in said dosage container, said dosage container end of said disinfectant fluid line in said dosage container defining said uniform volume of liquid disinfectant per pump cycle, said disinfectant fluid line having a minimum cross-sectional area, said cross-sectional area of said disinfectant fluid line sized in excess of said minimum cross-sectional area of said dosage passageway to preclude more than negligible addition to said uniform volume of liquid disinfectant per pump cycle;

and a venting member having a vent, said venting member having a vent in communication with said dosage container.

2. The chlorinator of claim 1 wherein:
said flow pump comprises a venturi pump.

3. The chlorinator of claim 2 wherein:
said dosage passageway is located through said venting member.

4. The chlorinator of claim 3 wherein:
said minimum cross-sectional area of said disinfectant fluid line being at least five times said minimum cross-sectional area of said dosage passageway.

5. The chlorinator of claim 4 wherein:
said venting member being removably attached to said dosage container.

6. The chlorinator of claim 4 wherein:
said venting member communicating with said reservoir container above said volume of disinfectant fluid.

7. The chlorinator of claim 1 wherein:
said dosage passageway is located through said venting member.

8. The chlorinator of claim 7 wherein:
said minimum cross-sectional area of said disinfectant fluid line being at least five times said minimum cross-sectional area of said dosage passageway.

9. The chlorinator of claim 8 wherein:
said venting member being removably attached to said dosage container.

10. The chlorinator of claim 9 wherein:
said venting member communicating with said reservoir container above said volume of disinfectant fluid.

11. The chlorinator of claim 1 wherein:
said minimum cross-sectional area of said disinfectant fluid line being at least five times said minimum cross-sectional area of said dosage passageway.

12. The chlorinator of claim 11 wherein:
said venting member being removably attached to said dosage container.

13. The chlorinator of claim 12 wherein:
said venting member communicating with said reservoir container above said volume of disinfectant fluid.

* * * * *